Aug. 7, 1923.
H. GUILLOU
DRIVING BELT AND THE LIKE
Filed Jan. 18, 1921
1,463,812
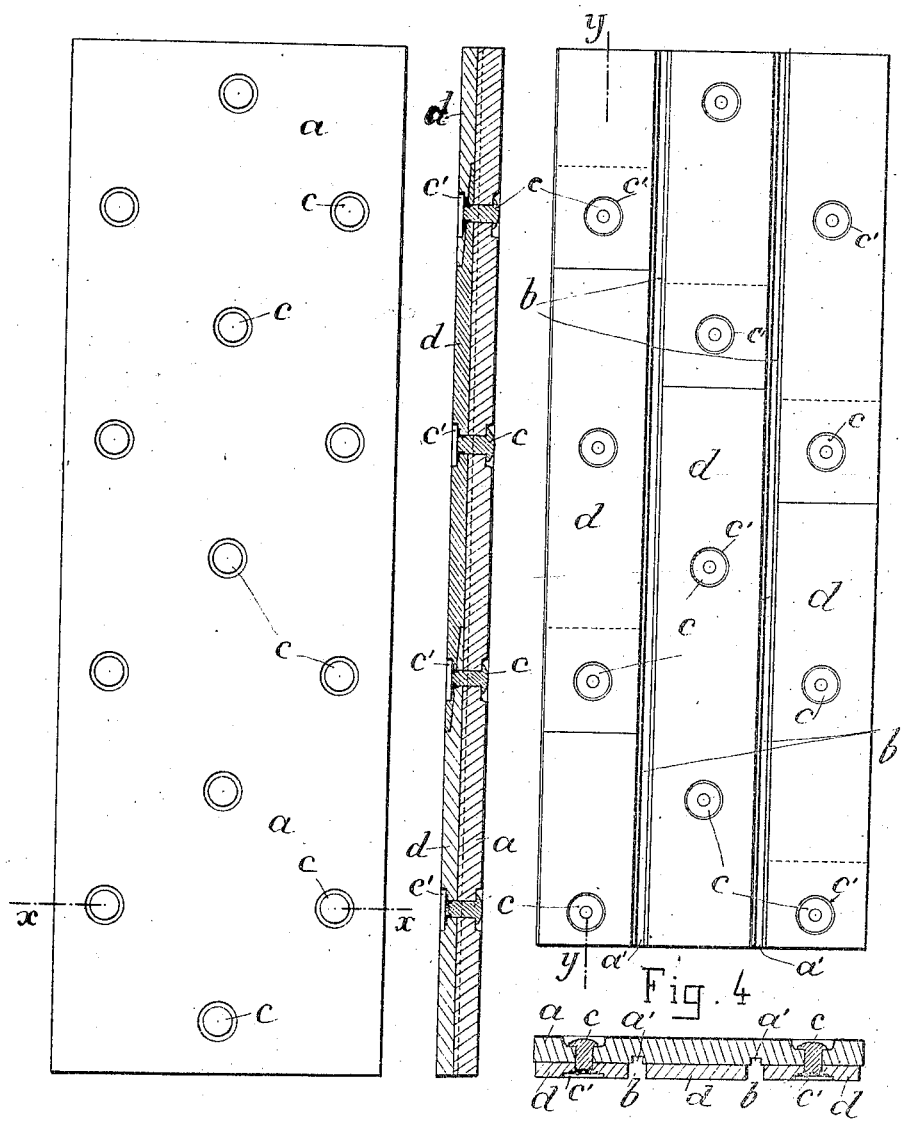

Patented Aug. 7, 1923.

1,463,812

UNITED STATES PATENT OFFICE.

HENRI GUILLOU, OF MONTROUGE, FRANCE.

DRIVING BELT AND THE LIKE.

Application filed January 18, 1921. Serial No. 438,193.

*To all whom it may concern:*

Be it known that I, HENRI GUILLOU, citizen of the French Republic, residing at 41 Rue de Bagneux, Montrouge, Seine, France, have invented new and useful Improvements in Driving Belts and the like, of which the following is a specification.

This invention relates to driving belts. Hitherto driving belts used industrially have had two grave disadvantages arising from their imperfect adhesion to the pulleys which they connect, as well as their want of flexibility and suppleness and their gradual and excessive stretching.

The lack of adhesion is particularly noticeable in driving belts formed of tanned leather; it arises from the insufficient friction of this leather on the pulley, the lack of flexibility and suppleness in a transverse direction, and also from the fact that small air pockets are imprisoned against the rim of the pulley by the belt, and particularly in the case of high speeds of rotation, these air pockets prevent the total contact necessary for the good working of the belt. These disadvantages compel the use of large pulleys and large belts which involve a great loss of power necessary to compensate for the lack of adhesion, the principle of operation of transmission by belts being based on the adhesion.

Chrome leather which is more flexible and has a better adhesion has sometimes been substituted for tanned leather; nevertheless, its use has been rapidly abandoned by reason of the great stretching of belts made with this leather, which involves frequent stoppage for the purpose of shortening or tightening up the belts.

The improved arrangement of driving belt having great adhesion, hereinafter described, overcomes these disadvantages.

According to this invention, a belt is provided which is composed of different substances having different properties, arranged and connected in a special and improved manner, with the object of producing a belt having great resistance to traction with a minimum power of stretching, great a adhesion and great transverse flexibility, from the fact on the one hand of the inner material being arranged in longitudinal bands separated by longitudinal continuous passages, and on the other hand of the parts which fasten together the said materials acting as ventilators.

With this object, the outer part of the driving belt or band, the duty of which is to resist the traction effect without undergoing appreciable elongation, is made of tanned leather, cotton, rubberized cloth and the like, while the inner part which comes in contact with the pulley is formed of a particularly adhesive material having the properties of flexibility and plasticity producing great adhesion; this adhesive material may be of chrome tanned leather or a product having an india rubber basis or any other product having the requisite qualities of adhesion which exclude in general a great resistance to traction; this adhesive material is arranged preferably in the form of continuous longitudinal bands slightly spaced apart with the triple object of first not injuring the transverse suppleness of the belt, second of creating between the bands longitudinal continuous passages draining away the air bubbles which, particularly at high speeds, are created between the contacting surfaces of the belt and the pulley and consequently injure the adhesion, and thirdly of increasing the pressure per unit of surface in contact.

The connection between the traction band and the adhesive material is obtained at a certain number of points more or less spaced apart by means of stitching points, rivets, or suitable clasps in such a way as to produce in the adhesive material owing to its plasticity a sort of local depression at each of the points of attachment. The result is that when the adhesive material is in contact with the rim of the pulley owing to the plasticity of this material as well as the specific pressure, air is expelled partly from these cathodes; consequently they perform to some extent the office of ventilators and very effectually assist the adhesion.

The invention will be more particularly described with reference to the accompanying drawings, in which:—

Figs. 1 and 2 are plan views respectively of the outer and inner faces of a belt constructed in accordance with the present invention.

Fig. 3 is a longitudinal section made on the line *y—y* of Fig. 2.

Fig. 4 is a transverse section on the line *x—x* of Fig. 1.

The outer part of the belt *a* which forms the traction band is flat externally and preferably divided internally by slots or grooves a' into a certain number of rectilinear bands, varying with the width of the belt. These slots a' are intended to give it more suppleness in a transverse direction. On each of these rectilinear bands, a band d of chrome tanned leather or other material having good adhesion is fixed by means of rivets c passing through the whole thickness of the belt. Each of the longitudinal bands d is not necessarily in one piece; it may be formed by a certain number of strips fixed end to end and imbricated to form a single and similar thickness and continuous contact surface. A small interval b is reserved opposite the slots or grooves a' between the adjacent adhesive bands d and forms a continuous longitudinal passage. Rivets c slightly compressing the adhesive material d form a series of local depression c' which produce a suction effect at the moment when this portion of the adhesive band is pressed on the rim of the pulley and will complete its adherence.

What I claim and desire to secure by Letters Patent is:—

1. A driving belt, comprising, in combination, an external band of traction resisting material, provided at its inner side with a plurality of longitudinally extending grooves, a plurality of internal longitudinal bands of uniform thickness secured to the inner side of the traction band between said grooves, said internal bands being formed of an adhesive, slightly supple and rough material, and metallic fasteners securing the internal bands to the external band, said fasteners being countersunk within the internal bands whereby a local depression is formed by each of said fasteners on the inner side of the belt.

2. A driving belt, comprising, in combination, an external band of traction-resisting material, said band being provided at its inner side with a plurality of longitudinally extending grooves, a plurality of internal, longitudinally extending bands of uniform thickness secured to the inner side of said external band, said internal bands being formed of chrome leather possessing a supple and strongly adhesive surface and spaced apart from each other thereby to form between them longitudinal grooves parallel and communicating with the grooves of the external band, and metallic fasteners securing the internal and external bands together, said fasteners being countersunk within the internal bands thereby to form local depressions on the inner side of the belt.

In testimony whereof I have signed my name to this specification.

HENRI GUILLOU.